June 5, 1945. H. R. CRANE 2,377,615
APPARATUS AND METHOD FOR PLASTIC LINING OF CONDUITS
Filed May 25, 1943
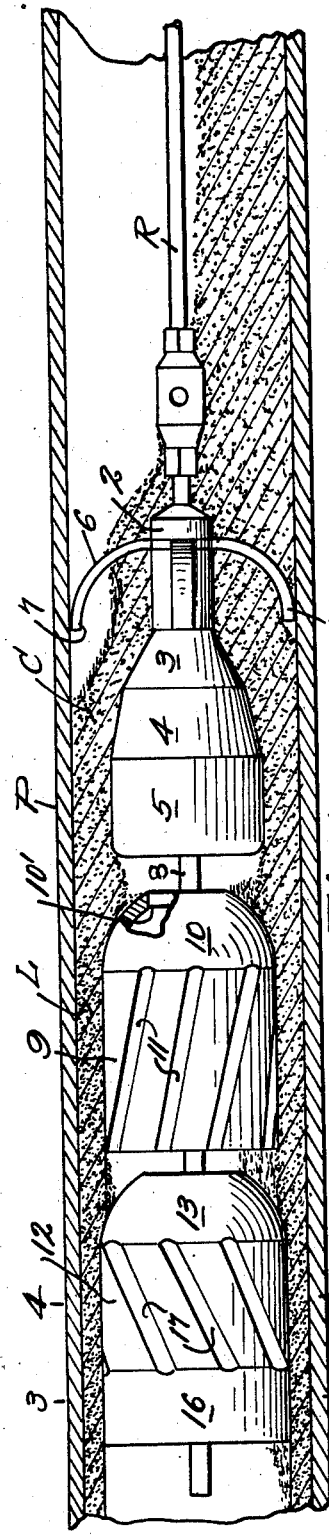
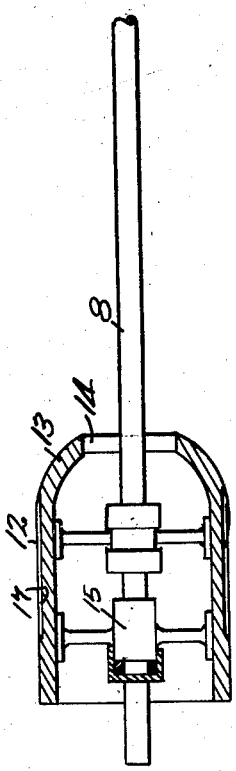
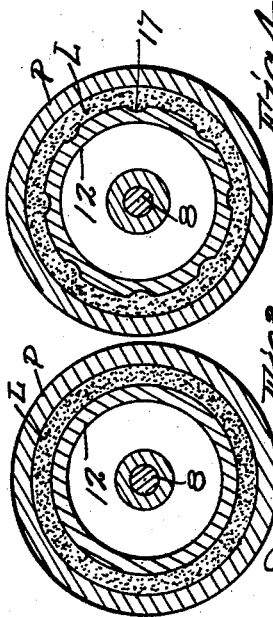
Hubert R. Crane,
INVENTOR;
By Frederick E. Maynard,
his Atty.

Patented June 5, 1945

2,377,615

UNITED STATES PATENT OFFICE 2,377,615

APPARATUS AND METHOD FOR PLASTIC LINING OF CONDUITS

Hubert R. Crane, Los Angeles, Calif.

Application May 25, 1943, Serial No. 488,467

12 Claims. (Cl. 25—38)

This invention is a means and a method for applying a desired lining of plastic material, for instance a cement plaster, to the bore wall face of various pipe and/or conduits, more especially, underground or installed iron water mains.

It has long been proposed to apply a desired lining of self-hardening, plastic material to pipe bore faces. Johnson et al. in Patent No. 22,654, of 1859, shows a pulled, plaster spreader, and others followed the method of that device, as in Newsom, Patent No. 1,548,161, of August 4, 1925, who claimed a method for first shaping the plaster on the bore face and twice compressing the layer. He, in that patent, shows a rigidly connected train of mandrel elements with sets of springs as centering guides which had the undesired effect of deeply channelling the soft layer after it had been spread on the bore face. Newsom endeavored to overcome channelling by a set of deep, longitudinal vanes or blades 30 (in Patent No. 1,629,202, of May 17, 1927) which dug deeply into the laid plaster and tended to bodily turn the whole layer and therefore break it away from the bore face after it had been compressed thereon, and, further, the deep blades act just as long plows and cut furrows in the mass loosened from the bore face, these furrows being run into by guides 33 at tail end of the plowing blades; then a tube former 24 advanced over the cut up mass.

Tate Patent No. 1,951,221, of March 13, 1934 (reissue No. 21,164, of July 25, 1939), closely followed the spreading and the successive compression step method of Newsom and the several claims of the reissue patent disclose a train of device combination connected with a universal joint or for a universal joint function to facilitate use of his several guides and the spreader in a curved pipe. Tate followed Hune, Patent 1,768,451, in the idea of dehydrating the plastic layer.

However the apparatus, in the state of the art mentioned, has a serious objection in that it is found there was formed at the bottom of laid plaster an accretion of water and fine cement which hardened into a flat, chordal bed reduced the coefficient of flow. Scott's Patent No. 2,293,365, of 1942, aimed to reduce this bed in the bore passageway. Scott employs a dehydrator and shows no means to eliminate the flat bed unless as by a thick plaster, and was in the ken of any of the prior art apparatus.

In view of this state of the art, and current practice, it is an object of this invention to provide a greatly simplified means and method, of the Newsom leadership, except that the centering means or guides is disposed well ahead of the body of the cement spreader to substantially eliminate channelling at the said body, and excepting that no plowing blades are used which bodily tear the compressed layer from the bore face in an effort to rotate the mass layer, but in the present invention a means is provided to positively compact the plastic layer; first, to extrude some water and then by a rotation of the compressor or rotary trowel to thoroughly solidify the lining, in place on the bore face, to such a degree as will provide for an early thinning and flushing out of the excess water and fine cement that may collect in the passageway, and thereby prevent building of a sediment bed.

Further, an object of the invention is to provide a method and means in and by which a final smoothing or semi-polishing is effected on the compacted plastic layer in a rotative function and gliding or sliding manner without circumferentially turning the laid plaster lining, and instead of furrowing the lining to give it as slick a surface as may be practical to obtain as high a flow efficiency in the passageway as may be possible on a cement lining.

The invention consists in certain advancements in the art of pipe lining as set forth in the ensuing disclosure and having, with the above, additional objects and advantages as hereinafter developed, and whose construction, combinations, and details of means and the manner of operation, and the method, will be made manifest in the ensuing description of the herewith illustrative apparatus; it being understood that modifications, variations and adaptations may be resorted to within the scope, spirit and principle of the invention as it is more particularly claimed in the addendum.

Figure 1 is a side elevation of the composite guide, spreader and trowelling tool (as in use). Figure 2 is an axial section of the final or trailer trowel member. Figure 3 is a cross-section on line 3—3, of Fig. 1, and Figure 4 is a cross-section on line 4—4 of Fig. 1.

The tool is here shown as used for the plaster lining of an iron, underground water pipe P, though, of course, it is not so limited in field of adaptations. The tool is designed to be pulled forwardly through the pipe P by any suitable draft device that is depicted as a strong train of flexible steel, sewer rods R.

The front end of the tool includes a combined ram 2 and flaring nose 3 at the rear end of which is the forward end of a cylindrical body member 5; the said forward end of which is flared or conical as shown at 4 and of a much flatter angle than is the leading nose 3; this composite leading member being of any suitable construction and being suitably fixedly attached to the near end of the draft rod series R. When the tool is to be used the passageway of the pipe P is suitably charged with a requisite volume of cement plaster C.

The diameter of the body member 5 is such that as the cement is crowded up all around the conical parts thereof a somewhat compressed annular layer L of plaster is forced to the face of the pipe bore. The ram 2 and the nose 3 cooperate to push ahead and out toward the pipe face the encountered mass of plaster and the conical fore end of the body 5 tends to center this distributing and partial compression member but it is desired that a positive mechanical device be combined to more quickly and more certainly center the distributing body 5. To do this a multi-legged spider 6 is fixed securely at the front end of the ram 2, which is of considerable length, and is of such maximum spread that the body member 5 is held closely on the line of the axis of the pipe P. The spread toes 7 of the spider 5 are preferably disposed so far ahead of the distributing flare 4 of the body 5 that any channels which may be made as a result of the forward movement of the spider in the plaster are quickly filled up and obliterated by the dispersing effect of the body nose 3 and the distributor cone 4 and therefore when the larger cylindric body part 5 comes on it works to compress a plastic mass that is substantially free of objectionable voids.

Fixed in and extending rearwardly from the body member 5 is a strong and stiff shaft 8 of suitable length and rotatively mounted on this shaft, and at a suitable space back of the member 5, is a hollow, cylindrical, elongate and smooth-faced compressing trowel 9, preferably of somewhat larger size than the cylindric member 5 for the purpose of additionally compressing the annular layer of plaster first bedded onto the bore face by the member 5.

As the layer or lining of plaster encountered by the leading trowel 9 may have a considerable water content the forward end of the trowel 9 is provided with a nearly hemispherical head 10 having a frontal mouth 10' of circular outline and as this head follows the compressor body member 5 any water squeezed out of the already laid lining collects in front of the head 10 and the heavy bottom sediment between the member 5 and the head 10 is forcibly trowelled into the bottom area of the annular lining L. Any excess water and unsettled fine cement can now flow back through the hollow, barrel-like leading trowel 9. A noticeable feature of this invention is the provision of means to effect a positive rotation of the barrel trowel 9 as it is pulled along the plaster lining in the pipe.

Such rotation is here accomplished by slightly rifling or grooving the smooth face of the trowel 9 as by suitably pitched, helical channels 11 disposed longitudinally in the periphery of the trowel 9, which, as stated, is rotative on the shaft; the channels opening at their front ends into the equatorial line of the head 10, or the front end line of the cylindrical trowel. The resistance of the compressed lining L of plaster reacts to cause the trowel 9 to turn screw-fashion and therefore to compress and to smooth the engaged surface of the plastic lining. It is to be especially noticed that this leading trowel 9, since it closely follows the first compressing member 5 plants much sediment from the extruded water at zone A into the bottom half of the arc of the circular lining, but provision is made for running off the clear water—by way of the open-ended barrel trowel; the rear end being open as well as the front.

Different cases and jobs, and different plastics may require different treatment and therefore one or more of rotary trowels (or barrels) may be employed. It is preferable that at least two rotary barrel trowels be incorporated in the tool, so that a great advantage may be obtained of having one rotate in one direction, as to the right by the first trowel 9, and to the left as by a second barrel trowel 12 which is hollow and open from end to end and has a frontal, hemispherical head 13 with a central mouth 14. The trowel 12 is freely rotatively mounted as by bearings 15 on the shaft 8, and which are constructed water proof in suitable manner.

A feature of the second, or trailing barrel trowel 12 is that its rear surface portion for a suitable length longitudinally of the body is made perfectly smooth annularly, almost polished, for the purpose of imparting a very smooth and hard-compacted surface to the plaster lining. This smooth area is shown at 16 and forwardly from it extends helical rifling or channels in the body to generate the desired rotation of the rotary trowel as it is pulled along behind the leading trowel 9; the trailing trowel 12 being somewhat larger in diameter than its leader to give final compression to the practically dehydrated lining.

The rotary trowelling combined with the multi-stage compression produces a densely compacted lining from which most of the water has been extruded, and the fine slimes of the cement are driven into the layer by the combined forward sliding and the angular rotation of the dressing trowels 9 and 12, and especially the finishing face trowel zone 16.

The slight rifling of the members gives an increased line of girth and therefore gives the member a larger surface of dehydrating effect.

What is claimed is:

1. The steps in lining a horizontal con____ with a plastic, which consists of laying a batc____ tic along the bottom of the conduit ____ then subjecting the plastic to dispersi____ the bore face of the conduit concentri____ jecting the concentric lining to an eve____ compacting effort by advancing a cylin____ axially therein, and then giving the fa____ compacted lining a rotary trowelling b____ ing the lining face to action of a freel____ axially moving, cylindric trowel.

2. The method of claim 1, and finally lining face a surface finishing operati____ jecting it to action of an axially mo____ rotative, cylindric trowel part.

3. A conduit lining tool having, in co____ a plastic dispersing and compacting n____ cluding a cylindric body the fore end ____ has a conic disperser, and a centering s____ idly fixed to said disperser and whose ____ minate well ahead of said body and adja____ cross plane of the front end of the dispe____ that the plastic is dispersed at a point r____ of the said toes and track voids are oblite____ the dispersed plastic and a trailing, non____ ing trowel turnably hitched to the said ____ and having means to effect rotation of th____

4. A conduit plaster working tool h____ combination, a freely rotative, lining face smoothing, trowel device, said device having a body with a generally smooth, cylindric effective face which is provided with shallow helical channels to effect trowel rotation while the trowel smooths the lining face.

5. A bore plastering tool having a freely rotative trowel, and which is provided with an external shallow, helically grooved area and a final dressing area.

6. A conduit plastic applying tool for bore use including a body member having a smoothing face helically channelled to effect rotation of the member while it is smoothing the face of the lining.

7. A conduit lining tool having, in combination, a plurality of cylindric, compacting trowels which are freely relatively rotative and have rotation effecting means, and means to finally smooth out the troweled face.

8. A conduit lining tool having, in combination, a plurality of rotative, cylindric, smoothing trowels, and non-grooving work controlled means for effecting rotation of the trowels.

9. A bore surface working tool having a plurality of cylindric trowels, said trowels having relatively reversed, helical grooving.

10. A conduit lining tool having, in combination, a joined train of cylindric, plastic compacting members which are clearly spaced axially for dehydration of the plastic and are open from end to end for by-pass of extruded water.

11. The tool of claim 10; certain of said members being freely rotative.

12. The tool of claim 10; certain of the members being provided in their compacting surfaces with shallow helical grooves to effect rotation thereof while compacting the face of the applied lining.

HUBERT R. CRANE.